United States Patent
Lee et al.

(10) Patent No.: US 10,601,005 B2
(45) Date of Patent: Mar. 24, 2020

(54) BATTERY MODULE AND METHOD FOR FABRICATING THE SAME

(71) Applicant: LG CHEM, LTD., Seoul (KR)

(72) Inventors: Su-Hang Lee, Daejeon (KR); Kyu-Hyun Choi, Daejeon (KR); Yong-Seok Choi, Daejeon (KR); Jin-Hak Kong, Daejeon (KR)

(73) Assignee: LG Chem, Ltd., Seoul (KR)

( * ) Notice: Subject to any disclaimer, the term of this patent is extended or adjusted under 35 U.S.C. 154(b) by 154 days.

(21) Appl. No.: 15/692,534

(22) Filed: Aug. 31, 2017

(65) Prior Publication Data

US 2018/0062127 A1    Mar. 1, 2018

(30) Foreign Application Priority Data

Sep. 1, 2016 (KR) .................. 10-2016-0112576

(51) Int. Cl.
| | |
|---|---|
| H01M 2/10 | (2006.01) |
| H01M 2/12 | (2006.01) |
| H01M 10/04 | (2006.01) |
| H01M 10/42 | (2006.01) |

(52) U.S. Cl.
CPC ....... *H01M 2/1061* (2013.01); *H01M 2/1066* (2013.01); *H01M 2/1077* (2013.01); *H01M 2/1235* (2013.01); *H01M 10/0413* (2013.01); *H01M 10/0418* (2013.01); *H01M 10/0431* (2013.01); *H01M 10/4207* (2013.01); *H01M 2220/20* (2013.01); *H01M 2220/30* (2013.01)

(58) Field of Classification Search
None
See application file for complete search history.

(56) References Cited

U.S. PATENT DOCUMENTS

| | | | |
|---|---|---|---|
| 2008/0116673 A1* | 5/2008 | Kim | B60R 21/239 280/742 |
| 2013/0230759 A1 | 9/2013 | Jeong et al. | |
| 2016/0221443 A1* | 8/2016 | Yao | H01M 2/1094 |

FOREIGN PATENT DOCUMENTS

| | | |
|---|---|---|
| JP | 2010-238554 A | 10/2010 |
| KR | 10-1281744 B1 | 7/2013 |
| KR | 10-2014-0141825 A | 12/2014 |
| KR | 10-2015-0057363 A | 5/2015 |
| KR | 10-2016-0001399 A | 1/2016 |
| KR | 10-2016-0058418 A | 5/2016 |

* cited by examiner

Primary Examiner — Sarah A. Slifka
(74) *Attorney, Agent, or Firm* — Morgan, Lewis & Bockius LLP

(57) ABSTRACT

Provided is a battery module that is simple, compact and sure to improve the mechanical performance against cell pressing, swelling and impacts and a method for fabricating the same. The battery module according to the present disclosure includes two or more pouch-type battery cells, and a hollow quadrilateral monoframe in which the battery cells are received, wherein the monoframe has a first opening and a second opening that are open to two sides in lengthwise direction of the battery cells, wherein a cushion bag is provided in close contact between the battery cells and the monoframe.

17 Claims, 10 Drawing Sheets

BATTERY MODULE AND METHOD FOR FABRICATING THE SAME

CROSS-REFERENCE TO RELATED APPLICATION

The present application claims the benefit of Korean Patent Application No. 10-2016-0112576 filed on Sep. 1, 2016 with the Korean Intellectual Property Office, the disclosure of which is incorporated herein by reference in its entirety.

TECHNICAL FIELD

The present disclosure relates to a battery module and a method for fabricating the same, and more particularly, to a battery module with an improved structure for fixing battery cells and a method for fabricating the same. Furthermore, the present disclosure relates to a battery pack comprising the battery module.

BACKGROUND ART

Due to their high applicability to various products and electrical properties such as a high energy density, secondary batteries are not only commonly applied to portable devices, but universally applied to electric vehicle (EV) or hybrid electric vehicle (HEV) that drive on an electric driving source. Secondary batteries are gaining attention for their primary advantage of remarkably reducing the use of fossil fuels and not generating by-products from the use of energy, making them a new eco-friendly and energy efficient source of energy.

Currently, commonly used secondary batteries include lithium ion batteries, lithium polymer batteries, nickel cadmium batteries, nickel hydrogen batteries, and nickel zinc batteries. These unit secondary battery cells, i.e., unit battery cells have the working voltage of about 2.5V~4.2V. Thus, in case that higher output voltage is required, a plurality of battery cells may be connected in series to form a battery pack. A battery pack may be also formed by connecting a plurality of battery cells in parallel based on the charge/discharge capacity required for the battery pack. Accordingly, the number of battery cells in the battery pack may be variously set based on the output voltage or charge/discharge capacity required.

Meanwhile, in case that a battery pack is formed by connecting a plurality of battery cells in series/in parallel, it is general to form a battery module using a plurality of battery cells first, and then form a battery pack using a plurality of battery modules with an addition of other elements.

Here, a conventional battery module has at least one cell cartridge in which at least one battery cell is mounted to guide the stacking of the battery cells and prevent the battery cells from moving. Generally, a plurality of cell cartridges stacked on top of each other guides the stacking of the plurality of battery cells. The conventional battery module designed to constrain the battery cell using the cell cartridge generally constrains the battery cell from moving by applying the pressure in the surface direction of the battery cell, to prevent the battery cell placed in fixed position from moving due to vibration or impacts. Furthermore, a foam pad is inserted between the battery cell and the cell cartridge to mitigate the volume expansion of the battery cell caused by electrode expansion and gas generation.

FIG. 1 is a schematic top view of a cell cartridge connected with battery cells according to the related art, and FIG. 2 is a cross-sectional view taken along the line II-II' in FIG. 1.

Referring to FIGS. 1 and 2, the cell cartridge 2 is formed by injection molding to fix the edges of the battery cell body, and when two battery cells 1 are mounted in the cell cartridge 2, the edges that constitute the periphery are inserted into the cell cartridge 2 and the battery cells 1 are received in the cell cartridge 2. In the conventional battery module, when the edges of the battery cells 1 are inserted into the cell cartridge 2, impacts or vibration occurring during mounting may be transmitted to the edges of the battery cells 1, causing damage to the battery cells 1, for example, breakage of an electrode assembly or an electrode lead 3 within the battery cells 1.

Describing in further detail with reference to FIG. 3 which is a partial enlarged diagram of section III in FIG. 2, movements in the x direction may be constrained by the contact of the shoulder of the battery cell 1 indicated by "a" and the cell cartridge 2, but if the pressing continues, the thickness of a separator in the battery cell 1 may be reduced, or the edge of an electrode may be broken, causing a short.

Furthermore, as shown in the section indicated by "b", the electrode lead 3 of the two battery cells 1 are fixed by welding, but the body of the battery cell 1 may move in the x direction due to vibration and impacts, causing damage to the lead 3 of the battery cell 1.

In addition, seeing the section indicated by "c", the edge of the battery cell 1 touches a counterpart such as the cell cartridge 2. Accordingly, in case that cell swelling occurs during charging/discharging of the battery cell 1 and BOL→EOL, it is difficult to create an internal gas pocket area, and the ultrasonic welded part in the battery cell 1 may be damaged, increasing the risk of a short. In case that the structure of the cell cartridge 2 is changed to prevent the edge of the battery cell 1 from touching the counterpart such as the cell cartridge 2, it is difficult to form a structure for fixing the battery cells 1 in the lengthwise direction.

As described above, because the conventional battery module structure has many problems, a new module structure is needed. Because the size and weight of the battery module are directly related to a receiving space and output of a corresponding medium and large device, manufacturers make efforts to fabricate battery modules having smaller size and lighter weight while ensuring higher output. To this end, it is necessary to develop a module structure that is simple, compact and sure to fix battery cells without using the conventional cell cartridge, so that the entire battery pack does not have a complex structure and does not occupy a large space.

Meanwhile, a new module structure should involve a change of a foam pad. This is because the conventional module structure is difficult to uniformize the applied pressure to control the cell pressing and swelling through a foam pad due to the tolerance of each element in the mass production.

DISCLOSURE

Technical Problem

The present disclosure is directed to providing a battery module that is simple, compact and sure to improve the mechanical performance against cell pressing, swelling and impacts, and a method for fabricating the same.

Technical Solution

To achieve the object, a battery module according to the present disclosure includes two or more pouch-type battery cells, and a hollow quadrilateral monoframe in which the battery cells are received, wherein the monoframe has a first opening and a second opening that are open to two sides in lengthwise direction of the battery cells, wherein a cushion bag is provided in close contact between the battery cells and the monoframe.

Preferably, the cushion bag is formed in a shape of a quadrilateral bag, and has an inner space that is defined and hermetically sealed by film outer walls, and a fluid injection port through which a fluid is injected into the inner space.

In this instance, the cushion bag increases in volume as the fluid is injected.

The fluid injection port may protrude out of the monoframe.

Air is preferably injected into the cushion bag.

The cushion bag may further have a venting hole to discharge air within the cushion bag when an external force is applied to the cushion bag.

The cushion bag may be provided at a contact surface between a large-area surface of the battery cell and the monoframe, and a contact surface between side surface of the battery cells and the monoframe.

A case of the battery cells may consist of a heat-fusible inner resin layer and an outer resin layer.

Electrode terminals of the battery cells may be formed in one or two directions.

The electrode terminals of the battery cells may be electrically connected in series or in parallel at one or two surfaces of the battery module.

The monoframe may be made of metal.

A method for fabricating a battery module according to the present disclosure includes stacking two or more pouch-type battery cells, preparing a hollow quadrilateral monoframe in which the battery cells are received, wherein the monoframe has a first opening and a second opening that are open to two sides in lengthwise direction of the battery cells, preparing a cushion bag that is formed in a shape of a quadrilateral bag, wherein the cushion bag has an inner space that is defined and hermetically sealed by film outer walls, and a fluid injection port through which a fluid is injected into the inner space, inserting the battery cells through the first opening or the second opening of the monoframe with the cushion bag interposed between the battery cells and the monoframe, and injecting a fluid into the cushion bag, leading to volume expansion, so that the cushion bag is provided in close contact between the battery cells and the monoframe.

The fluid injection port may protrude out of the monoframe, and the fluid injection may be performed by connecting a compressor.

Preferably, air is injected into the cushion bag, and the cushion bag further has a venting hole discharge air within the cushion bag when an external force is applied to the cushion bag, so as to achieve pressure control.

Preferably, the cushion bag is provided at a contact surface between a large-area surface of the battery cell and the monoframe and a contact surface between side surface of the battery cell and the monoframe.

The fluid injection may be performed periodically to maintain a uniform pressure in the cushion bag.

The present disclosure further provides a battery pack comprising the battery module.

The battery pack may be used for a power source of a medium and large device, and the medium and large device may be a power tool; an electric car including an electric vehicle (EV), a hybrid electric vehicle (HEV) and a plug-in hybrid electric vehicle (PHEV); an electric bicycle including an E-bike and an E-scooter; an electric golf cart; an electric truck; an electric commercial vehicle or a system for storing power.

Advantageous Effects

According to the present disclosure, a hollow quadrilateral monoframe-type module case, not a conventional cell cartridge, is used, and a cushion bag is interposed between a battery cell and a monoframe, making it possible to fix the monoframe and battery cell in close contact through the cushion bag. Accordingly, dissimilar to the conventional cell cartridge that presses and fixes the battery cell when the edges of the battery cell are inserted into the cell cartridge, the design margin of the entire battery module increases, and it is possible to solve the conventional problem with the transmission of impacts or vibration occurring during mounting to the battery cell when inserting the edges of the battery cell into the cell cartridge.

Particularly, according to the present disclosure, any mechanical pressure is not applied to the shoulder of the battery cell. Accordingly, it is possible to fundamentally avoid a risk of a short resulting from a reduction in separator thickness in the battery cell or breakage of the edge of the electrode due to continuous pressing.

As described above, according to the present disclosure, a cell cartridge can be replaced with a monoframe by using a cushion bag, and accordingly, advantages are that it is possible to prevent the transmission of impacts or vibration to the edges of the battery cell when the battery cell is mounted in and kept in connection with the cell cartridge, there is no problem caused by continuous pressing, and a gas pocket area can be created. Accordingly, when mounting the battery cell in the cell cartridge and keeping in connection between, damage to the battery cell is prevented, and provided is a battery pack comprising the battery module.

The battery module and the battery pack have an excellent effect in protecting the battery cell from external vibration and thus they are advantageous to vehicle that is frequently exposed to external vibration.

According to the present disclosure, fixing between the battery cell and the monoframe can be firmly insured, and in the event of volume expansion with the increasing cycles of the battery cell, a stable space capable of receiving such expansion is provided. As the present disclosure uses the cushion bag, assembly between the battery cell and the monoframe is made easy, the battery cell can be firmly placed in fixed position in the event of vibration and impacts, and battery swelling can be accommodated.

As described above, the present disclosure provides a battery module that is simple and compact without using the conventional cell cartridge, so that the entire battery pack does not have a complex structure and does not occupy a large space. Furthermore, the cushion bag has an advantage; the cushion bag can uniformize the applied pressure for control of cell pressing and swelling. Cell pressing, swelling and impacts can be responded through the cushion bag, thereby improving the mechanical performance of the battery module.

BRIEF DESCRIPTION OF THE DRAWINGS

The accompanying drawings illustrate a preferred embodiment of the present disclosure and together with the foregoing disclosure, serve to provide further understanding of the technical aspects of the present disclosure, and thus, the present disclosure is not construed as being limited to the drawings.

MODE FOR CARRYING OUT THE INVENTION

Figure 1:
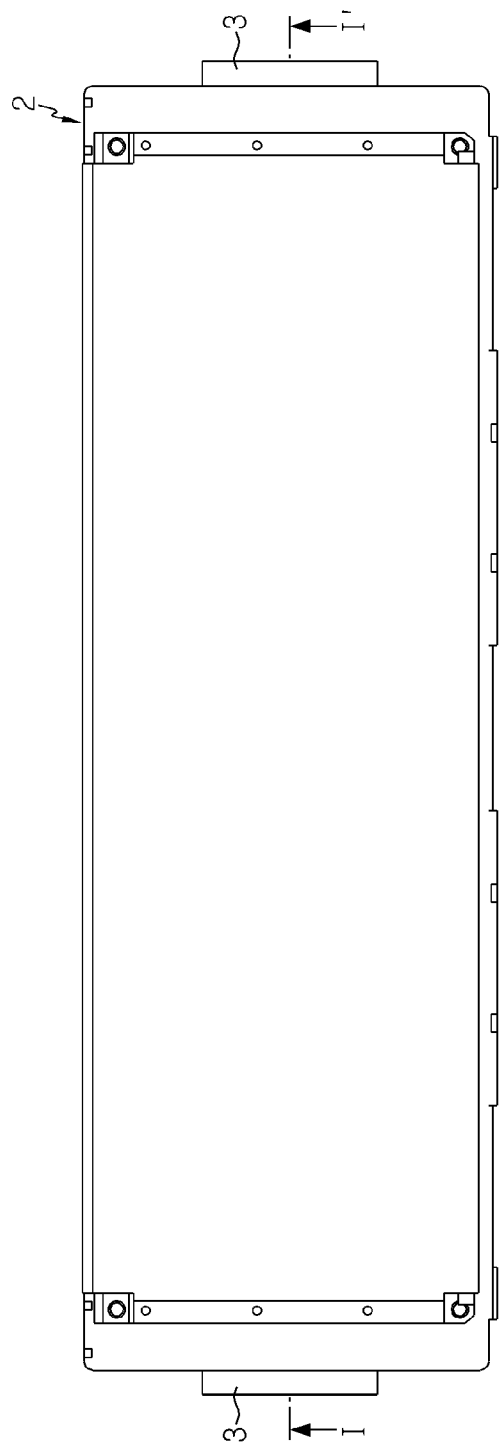
FIG. 1 is a schematic top view of a cell cartridge connected with battery cells according to the related art.
Figure 2:
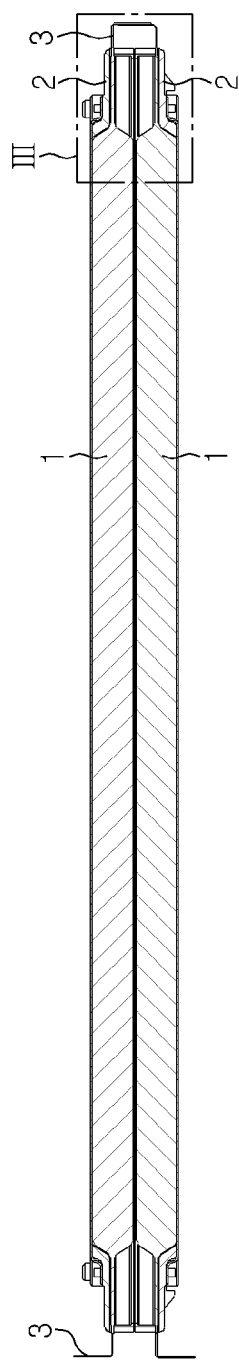
FIG. 2 is a cross-sectional view taken along the line II-II' in FIG. 1.
Figure 3:
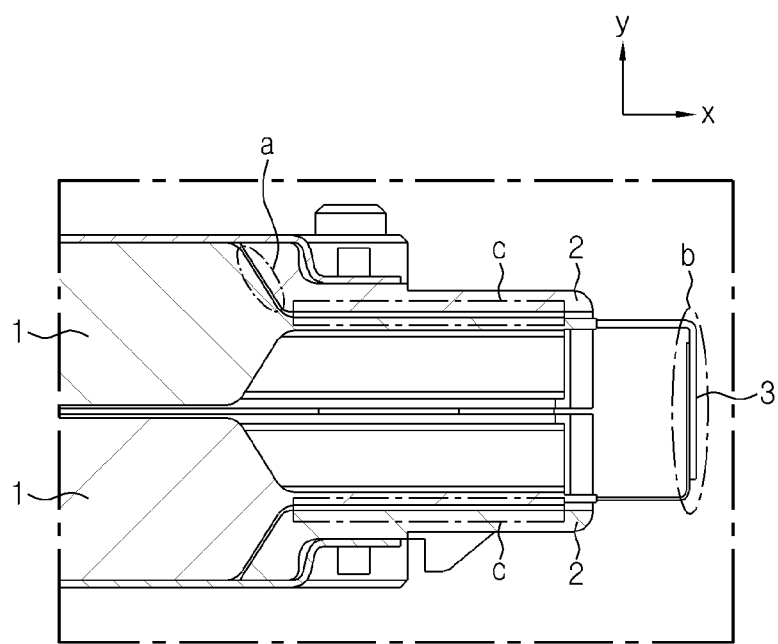
FIG. 3 is a partial enlarged view of section III in FIG. 2.

The present disclosure will be apparent from a detailed description of preferred embodiments of the present disclosure made with reference to the accompanying drawings. The disclosed embodiments are provided for illustration purposes to help the understanding of the present disclosure, and it should be understood that the present disclosure may be practiced according to the disclosed embodiments as well as a variety of other modified embodiments. Furthermore, to help the understanding of the present disclosure, the accompanying drawings are not illustrated on actual scale and the dimension of certain elements may be exaggerated.

Hereinafter, the embodiments of the present disclosure are described in sufficient detail with reference to the accompanying drawings to enable those having ordinary skill in the technical field pertaining to the present disclosure to easily practice the present disclosure. However, the present disclosure may be embodied in many different forms and is not limited to the disclosed embodiments. In the drawings, the parts irrelevant to description are omitted to clearly explain the present disclosure, and the same or similar elements are given the same reference sign throughout the specification.

Figure 4:
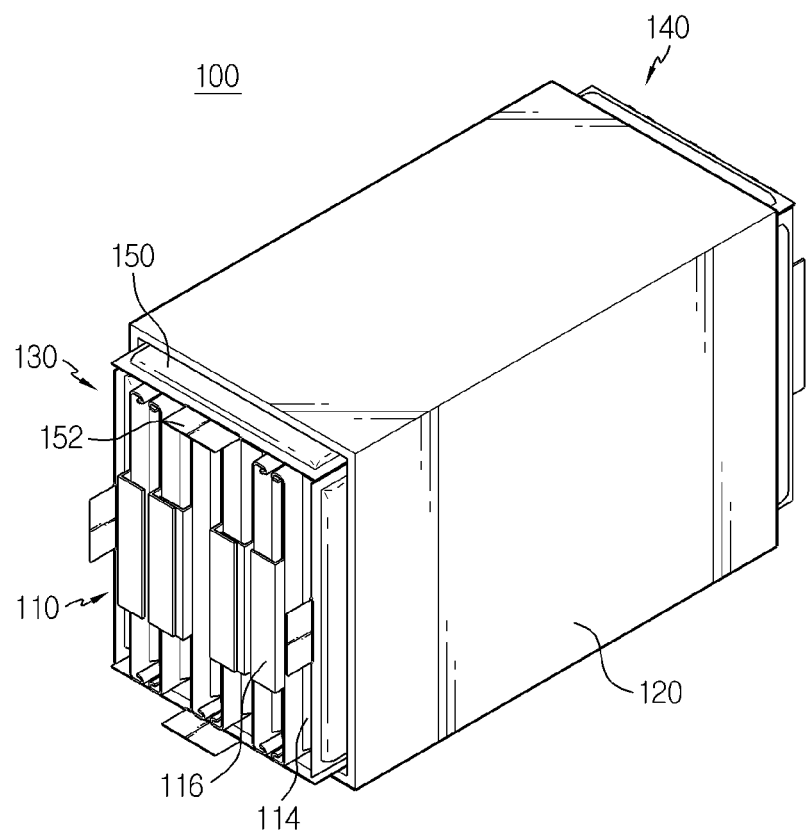
FIG. 4 is a schematic perspective view of a battery module according to an embodiment of the present disclosure.
Figure 5:
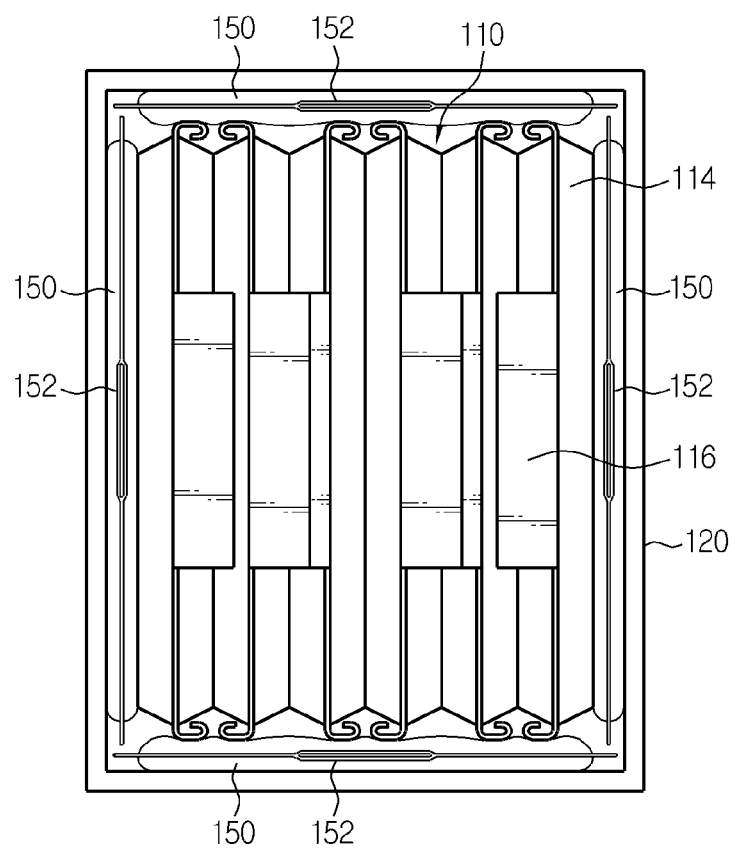
FIG. 5 is a schematic front view of the battery module of FIG. 4.

FIG. 4 is a schematic perspective view of a battery module according to an embodiment of the present disclosure. FIG. 5 is a schematic front view of the battery module of FIG. 4, and FIG. 6 is a side projection diagram of the battery module of FIG. 4.

Figure 6:
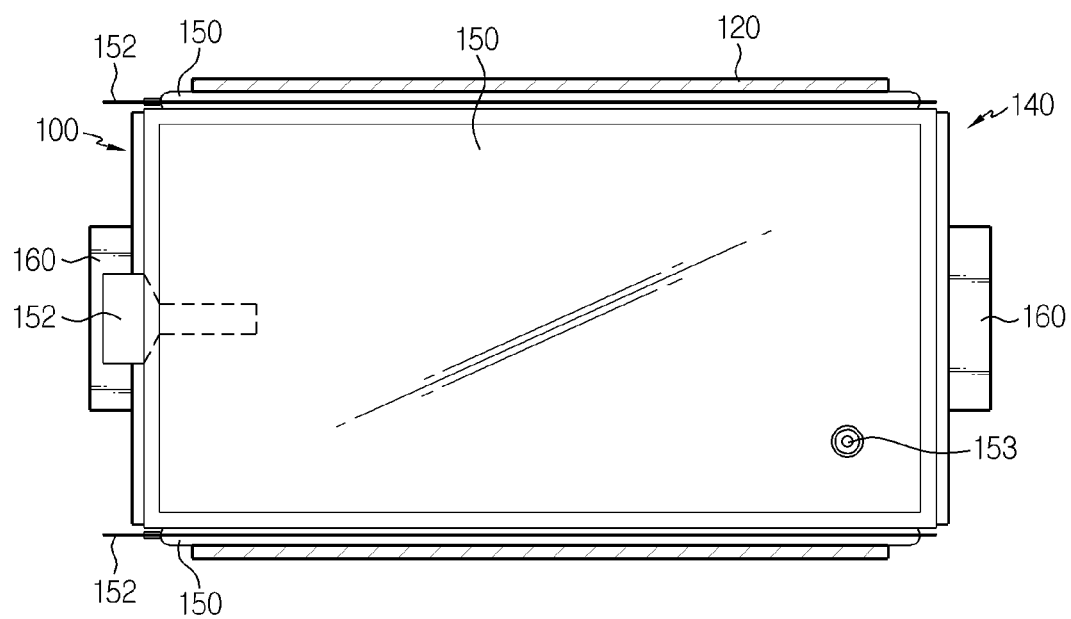
FIG. 6 is a side projection diagram of the battery module of FIG. 4.

Referring to FIGS. 4 to 6, the battery module 100 includes two or more pouch-type battery cells 110, and a monoframe 120 in which the battery cells 110 are received.

The monoframe 120 is in a hollow quadrilateral shape with a first opening 130 and a second opening 140 that are open to two sides in the lengthwise direction of the battery cells 110.

The first opening 130 and the second opening 140 are open to two sides along the lengthwise direction of the battery cells 110 in the monoframe 120. That is, the monoframe 120 is formed in a hollow quadrilateral shape that is open at two opposing sides and has the remaining four surfaces connected to each other.

The monoframe 120 is a module case of which two sides and the upper and lower surfaces are integrated. Accordingly, the monoframe is constructed such that the upper, lower and left side and right side surfaces are all integrated on the whole without separate subsequent connecting element such as welding or bolting and hook coupling. Because the side surfaces and the upper and lower surfaces do not have separate connecting element and they are originally integrated, a process for fabricating the module case is made easy, the fabrication time is shortened, and the rigidity of the module case can be effectively improved.

In the monoframe 120, for example, 4~10 battery cells 110 may be stacked and slidingly inserted and embedded in parallel arrangement perpendicular to the lengthwise direction.

The battery cells 110 may stand erect in the vertical direction and may be arranged in the horizontal direction. For example, in the configuration of FIGS. 4 and 5, provided a side where the electrode terminal 116 is seen on the whole is defined as a front side of the battery module, when the battery module is viewed from the front side of the battery module, the plurality of battery cells 110 may be arranged such that they stand erect perpendicular to the ground with large-area surfaces facing the left and right sides. That is, in the battery module according to the present disclosure, the battery cells 110 may stand erect such that each of large-area surfaces faces the left and right sides, and the side surfaces of the battery cells 110 are placed on the upper, lower, front and rear sides. Furthermore, the battery cells 110 standing erect may be arranged parallel to each other in the left and right directions such that the large-area surfaces face each other. Meanwhile, unless otherwise stated, the direction such as front, rear, left, right, upper, and lower as used herein is distinguished on the point of view when the battery module is viewed from a front side, provided the front side is defined as a side where the electrode terminal 116 protruding as described above is seen on the whole in the drawings.

A cooling plate (not shown) may be further provided below the battery cells 110. At least a part of the cooling plate may be made of a heat conducting material. Accordingly, when heat is generated from the battery cells 110, the cooling plate may transmit the heat to the outside of the battery module. The cooling plate may be made of a metal material. For example, the cooling plate is entirely made of a single attribute material of metal such as aluminum, copper or iron, or may be made of at least one alloy material of them. According to this embodiment of the present disclosure, through the cooling plate, heat from the battery cells 110 may be effectively transmitted to the outside, the rigidity of the battery cells 110 may be enhanced, and the battery module may be protected from external impacts. Instead of including a separate cooling plate, the lower surface of the monoframe 120 may act as the cooling plate.

In this embodiment, a cushion bag 150 is provided at a contact surface between the large-area surface of the battery cell 110 and the monoframe 120 and a contact surface between the side surface of the battery cells 110 and the monoframe 120, and these cushion bags 150 are placed in close contact with the battery cells 110 and the monoframe 120. Through this, the battery cells 110 and the monoframe 120 may be fixed. Furthermore, by this close contact, there is no empty space between the internal components, so damage causing to the main structure is reduced even in a situation in which external impacts are applied, thereby improving the rigidity of the battery module 100.

Electrode terminals 116 of the battery cells 110 are connected to each other. More preferably, for the battery cells 110 to maintain a stable stack structure, an adhesive member such as a sticky adhesive, for example, a double-sided tape, or a chemical adhesive bonded by chemical reaction during adhesion may be placed at a location at which the battery cells 110 face each other.

Figure 7:
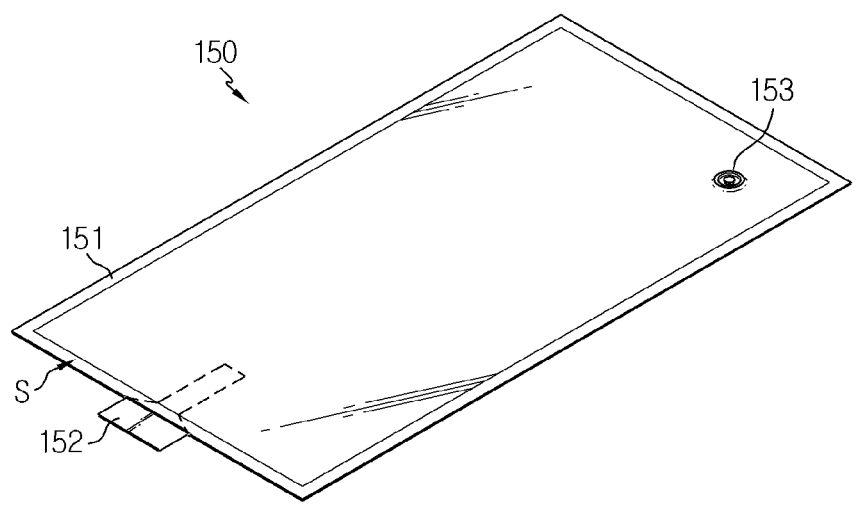
FIG. 7 is a diagram of a cushion bag included in a battery module according to an embodiment of the present disclosure before fluid injection.
Figure 8:
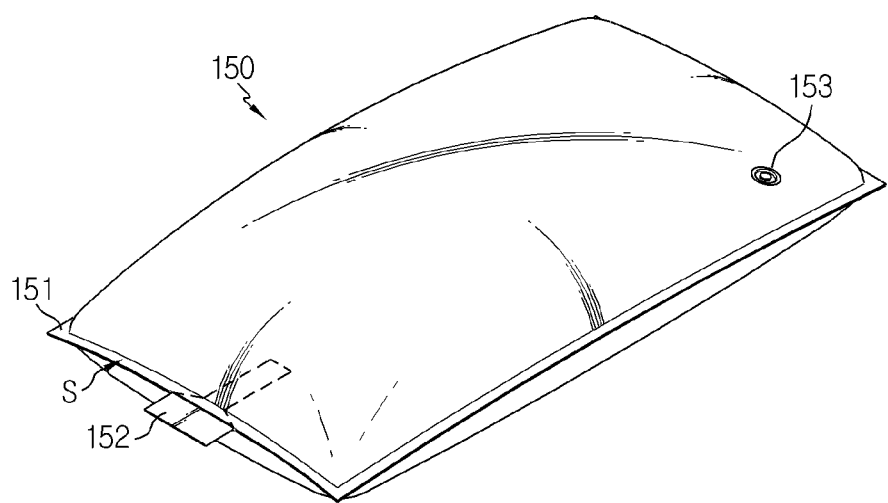
FIG. 8 is a diagram of a cushion bag included in a battery module according to an embodiment of the present disclosure after fluid injection.

FIG. 7 is a diagram of the cushion bag included in the battery module according to an embodiment of the present disclosure before fluid injection, and FIG. 8 is a diagram of the cushion bag included in the battery module according to an embodiment of the present disclosure after fluid injection.

Referring to FIGS. 7 and 8, the cushion bag 150 is formed in the shape of a quadrilateral bag, and has an inner space defined and hermetically sealed by film outer walls 151, and a fluid injection port 152 through which a fluid can be injected into the inner space.

For example, the cushion bag 150 may be formed by stacking two quadrilateral films and sealing S all the edges of the remaining four surfaces except the fluid injection port 152.

The fluid injection port 152 is a hole through which a fluid can be injected into the inner space of the cushion bag 150. The fluid injection port 152 may be provided at the end of the cushion bag 150, for example, on the upper side as shown in FIG. 7 or FIG. 8, and may be formed anywhere in the film outer walls 151. A fluid such as air may be injected into the inner space of the cushion bag 150 through the fluid injection port 152. Furthermore, on the contrary, the fluid such as air filled in the inner space of the cushion bag 150 may be discharged through the fluid injection port 152. The number of fluid injection ports 152 provided in the cushion bag 150 is not limited to only one, and two or more fluid injection ports 152 may be provided. In case that two or more fluid injection ports 152 are provided, the fluid is injected or discharged through many fluid injection ports 152, and the flow of the fluid in and out of the inner space of the cushion bag 150 may be made more easily and quickly. Preferably, the fluid injection port 152 protrudes out of the monoframe 120 to facilitate the access from the outside. In this case, even after assembly of the module or pack, it is possible to inject a fluid from the outside. For example, the fluid injection port 152 may be formed in a similar structure to an air injection port formed in a tire to inject air through a compressor.

The inner space of the cushion bag 150 may change in volume as flow-in/out of the fluid such as air. That is, when air is injected through the fluid injection port 152, the inner space of the cushion bag 150 may increase in volume. On the contrary, when air is discharged through the fluid injection port 152, the inner space of the cushion bag 150 may reduce in volume.

As described above, according to an embodiment of the present disclosure, because the volume of the inner space of the cushion bag 150 changes as the fluid flows in and out through the fluid injection port 152, the film forming the outer walls 151 of the cushion bag 150 is preferably made of a suitable material.

The film for the outer walls 151 may be made of rubber. Furthermore, the film may be made of polymer. Most of all, preferably, a material is so flexible that the volume of the inner space flexibly changes with an amount of the fluid filled in the inner space. Particularly, the film for the outer walls 151 is preferably an insulating material having the dielectric breakdown strength of 10 kV/mm or more. When the voltage gradually increases after the voltage is applied to the insulating material, the material loses insulation at a certain point in time and an electric current flows, and this is called a dielectric breakdown phenomenon. The dielectric breakdown strength is obtained by dividing the voltage V at which dielectric breakdown occurs, by the thickness d of the material. When an insulating material having the dielectric breakdown strength of 10 kV/mm or more is used as a material of the cushion bag 150, it is desirable because a risk of electrical conduction with the outside is prohibited. The insulating material may include, for example, at least one selected from the group consisting of polyethylene (PE), polypropylene (PP), polystyrene (PS), polyethylene terephthalate (PET), polyamides (PA, nylon), polyester (PES), polyvinyl chloride (PVC), polyurethanes (PU), polycarbonate (PC), polyvinylidene chloride (PVDC, Saran), polytetrafluoroethylene, (PTFE, Teflon), polyetheretherketone (PEEK, Polyketone) and polyetherimide (PEI, Ultem). The use of the insulating material having the dielectric breakdown strength of 10 kV/mm or more may improve insulation and further enhance electrical safety of the battery module 100.

Preferably, the cushion bag 150 increases in volume as the injection of the fluid. Because the cushion bag 150 is placed in the limited space between the battery cell 110 and the monoframe 120, when the volume increases as the injection of the fluid, the pressure of the inner space changes. As the volume increases, the pressure of the inner space increases.

A fluid such as gas or liquid may be injected into and filled in the inner space of the cushion bag 150. Preferably, air is preferably injected into the inner space of the cushion bag 150. This is because air has many advantages; air is lighter and more available than liquid. In addition to air, various types of gas or liquid may be injected into the inner space of the cushion bag 150.

Particularly, in case that air is injected into the cushion bag 150, the cushion bag 150 may further have a venting hole 153 through which air in the cushion bag 150 is discharged when an external force is applied to the cushion bag 150. For example, when a predetermined pressure is reached due to swelling, air in the inner space is discharged through the venting hole 153. The venting hole 153 may be provided at the end of the cushion bag 150, for example, on the lower side that is opposite to the side where the fluid injection port 152 is formed as shown in FIG. 7 or FIG. 8, and may be formed anywhere in the outer walls 151. The venting hole 153 may include an air discharge hole and a cover to close the hole. The cover is provided at the air discharge hole to open and close the air discharge hole. That is, when the air discharge hole is covered with the cover, the inner space of the cushion bag 150 maintains the air-tight condition. Furthermore, when the cover is pulled or taken from the air discharge hole, the inner space of the cushion bag 150 is released from the air-tight condition, and air is discharged through the air discharge hole.

Because the cushion bag 150 has the fluid in the inner space, the cushion bag 150 can be compressed to some extent when an external force is applied, and can function to absorb the pressure in the event of cell swelling. Furthermore, the cushion bag 150 is provided in close contact between the battery cell 110 and the monoframe 120 to fix them. Accordingly, the long-term service life is insured without a reduction in the fixing strength, and thus, there is an effect in stably sustaining the module structure. In addition, when fluid injection is further performed periodically, a uniform pressure in the cushion bag 150 is maintained. In a situation where the cell is pressed and swollen, it is possible to control the pressure desired by a user through periodic fluid injection. Particularly, when the cell is swollen, the internal air is discharged through the venting hole 153 of the cushion bag 150 while a uniform pressure is maintained, thereby controlling stress occurring in an external structure.

As described above, a uniform pressure that is difficult to achieve by the conventional foam pad can be achieved through the cushion bag 150.

Meanwhile, although the cushion bag 150 is shown in the shape of a quadrilateral bag having a single inner space, the cushion bag 150 may have various shapes according to the structure, for example, a shape of a frame with a hollow center, or a shape in which an inside is divided into parts to include isolated inner spaces. The cushion bag 150 has a size corresponding to the total area of the large-area surface of the battery cell 110, or may have a size corresponding to a certain area.

According to the present disclosure, the cushion bag 150 is provided in close contact between the battery cell 110 and the monoframe 120 to fix them, and in the event of cell pressing, swelling and impacts, the cushion bag 150 exerts a uniform pressure in response to the cell pressing, swelling and impacts. As described above, the use of the monoframe 120 eliminates the need for the conventional cell cartridge that presses and fixes the edges of the battery cell 110. The use of the cushion bag 150 can overcome the limitation of the conventional foam pad that cannot achieve a uniform pressure. The cushion bag 150 uses fluid injection to maintain the pressure desired by a designer. As described above, according to the present disclosure, when designing the battery module 100, the degree of freedom increases, leading to the fabrication of the battery module of various structures and capacities, and the mechanical performance of the module is greatly improved.

In the present disclosure, the battery cell 110 is not limited to a particular type and may include any rechargeable secondary battery. For example, a lithium secondary battery, a Ni-MH secondary battery, and a Ni—Cd secondary battery are available, but a lithium secondary battery with high output to weight can be preferably used.

Referring back to FIGS. 4 and 5, the battery cell 110 of the present disclosure is a pouch-type battery cell, in which an electrode assembly of positive electrode/separator/negative electrode structure connected to electrode terminals 116 extending out of the case is embedded in a laminate sheet case 114.

That is, the electrode terminals 116 (positive electrode terminal and negative electrode terminal) electrically connected to the electrode assembly protrude out of the battery cell case 114. In the drawings, the electrode terminals 116 may protrude in only one direction from the left or right side of the battery cell case 114, and may protrude in two directions from the left and right sides. Finally, the electrode terminals 116 are electrically connected in series or in parallel at one or two surfaces of the battery module 100 having an approximately hexagonal shape, and the outermost positive/negative electrode terminals extend out of the battery module 100.

In this instance, when the electrode terminals 116 protrude in only one direction from the case 114, the monoframe 120 of the present disclosure should be open on only one side surface, and when each protrudes in two directions, the monoframe 120 should be open on two side surfaces. FIGS. 4 to 6 show an example in which the two side surfaces of the monoframe 120 are open.

The battery cell case 114 may include all an inner resin layer for heat fusion, a metal layer, and an outer resin layer for improving durability as commonly, but as described below, in the present disclosure, the monoframe 120 in perfectly air-tight condition can act as a conventional metal layer, and the cell case 114 may only include the inner resin layer and outer resin layer with no metal layer.

The monoframe 120 may be made of metal. The metal has good thermal conductivity and can perform a heat radiation/dissipation function as a whole. The material of the monoframe 120 may include all metals, but is preferably SUS-based or Al-based materials in consideration of thermal conduction, processing, and costs.

In the present disclosure, connection between the battery cells 110 and between the battery cell 110 and an external terminal may be established beforehand at the outside, followed by insertion into the monoframe 120.

Specifically, before the battery cell 110 is inserted into the monoframe 120, electrical connection between the electrode terminals 116 of and between the battery cell 110 and an external terminal is established beforehand, followed by insertion into the monoframe 120, thereby eliminating the need to weld an additional component for electrical connection of terminals. Accordingly, working easiness is excellent.

Figure 9:
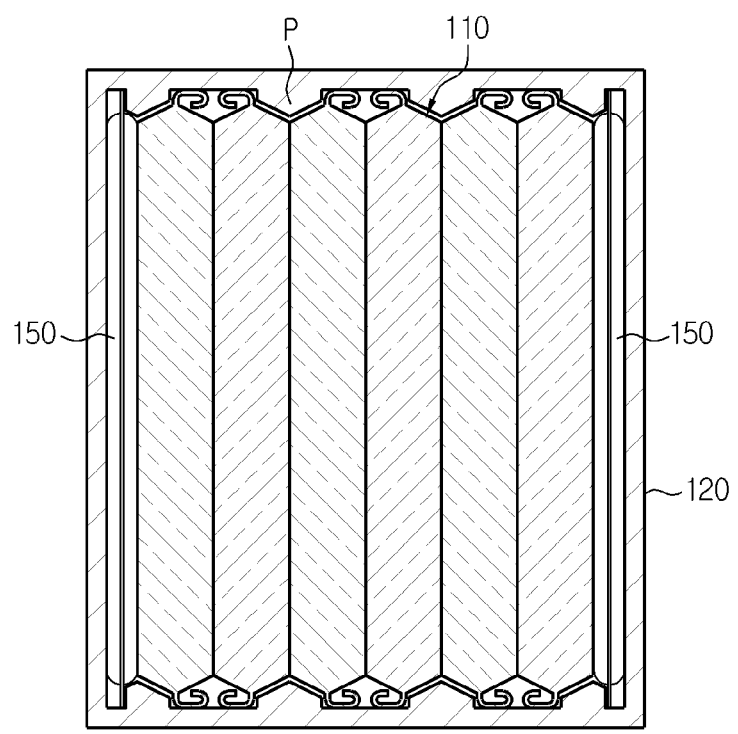
FIG. 9 is a schematic cross-sectional view of a battery module according to another embodiment of the present disclosure.

FIG. 9 is a schematic cross-sectional view of a battery module according to another embodiment of the present disclosure.

Referring to FIG. 9, a convex part P is formed on the upper surface and the lower surface of the monoframe 120 to receive and fix the battery cells 110, so that the seating position of the battery cell 110 is guided, thereby improving the assembly performance of the battery module. Furthermore, by the convex part P, left and right movements of the battery cells 110 are suppressed, thereby further improving the bond between the battery cells 110 and the monoframe 120. In this case, the cushion bag 150 may be only provided in close contact at the contact surfaces between the large-area surfaces of the battery cells 110 and the monoframe 120.

Meanwhile, the present disclosure relates to a battery pack including the battery module 100.

Particularly, the battery pack according to the present disclosure is suitable for a power source of a medium and large device. In the case of the medium and large battery pack, a plurality of battery cells is stacked and used to ensure high output, large capacity performance, and the battery modules that constitute the battery pack need a more compact and simple structure.

Specifically, the medium and large device may include, for example, a Power Tool; an electric car including an Electric Vehicle (EV), a Hybrid Electric Vehicle (HEV) and a Plug-in Hybrid Electric Vehicle (PHEV); an electric bicycle including an E-bike and an E-scooter; an Electric Golf Cart; an electric truck; an electric commercial vehicle or a system for storing power.

The specific structure and fabrication method of the medium and large battery pack are known in the art, and its description is omitted herein.

Figure 10:
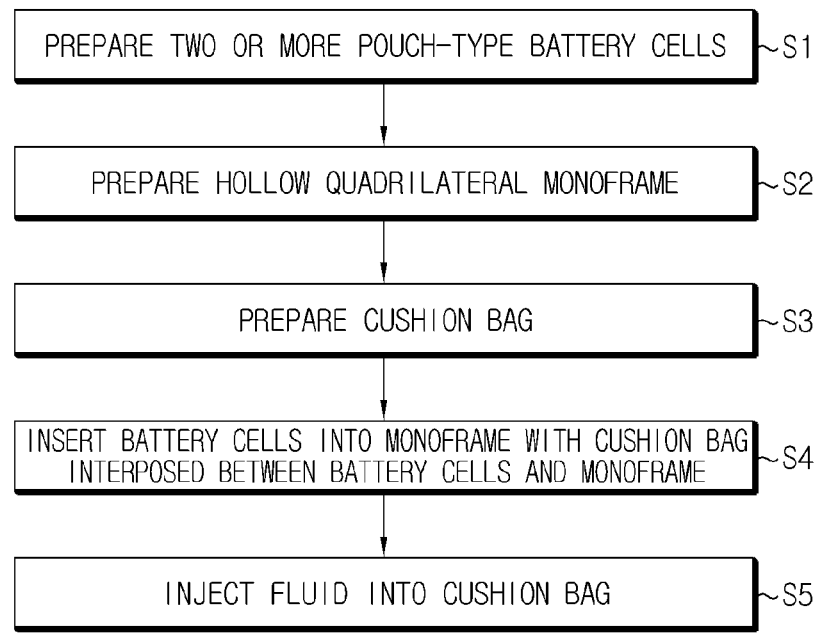
FIG. 10 is a flowchart of a method for fabricating a battery module according to an embodiment of the present disclosure.

Hereinafter, a method for fabricating a battery module according to an embodiment of the present disclosure is described in detail with reference to FIG. 10. FIG. 10 is a flowchart of a method for fabricating a battery module according to an embodiment of the present disclosure.

Two or more pouch-type the battery cells 110 are stacked first (S1). In this instance, when connection is established between the battery cells and between the battery cell and an external terminal, the subsequent assembly process is made easy.

Subsequently, the monoframe 120 is prepared (S2). As described previously, the monoframe 120 is in a hollow quadrilateral shape that receives the battery cells 110 inside, with the first opening 130 and the second opening 140 that are open to two sides in the lengthwise direction of the battery cells 110.

Subsequently, the cushion bag 150 proposed by the present disclosure is prepared (S3). The cushion bag 150 is also formed in the shape of a quadrilateral bag as described previously, and has an inner space defined and hermetically sealed by the film outer walls 151 and the fluid injection port 152 through which a fluid is injected into the inner space.

Subsequently, the battery cells 110 are inserted into the monoframe 120 (S4). In this instance, the battery cells 110 may be inserted through the first opening 130 or the second opening 140 of the monoframe 120, and particularly, the battery cells 110 are inserted with the cushion bag 150 interposed between the battery cell 110 and the monoframe 120.

Before the battery cell 110 is inserted into the monoframe 120, electrical connection is established beforehand between the electrode terminals 116 of the battery cell and between the battery cell 110 and an external terminal, followed by insertion into the monoframe 120, thereby eliminating the need to weld an additional component for electrical connection of terminals. Accordingly, working easiness is excellent.

The cushion bag 150, into which a fluid is not yet injected, is flat as shown in FIG. 7, allowing the cushion bag 150 to enter a narrow space between the battery cell 110 and the monoframe 120 without any difficult. That is, because an assembly tolerance is sufficient before fluid injection, rapid assembly is possible. Accordingly, the time and cost reduces in terms of productivity. If the conventional foam pad is applied to the monoframe 120, pressing the foam pad and inserting it into an empty space between the battery cell 110 and the monoframe 120 is very difficult, and after assembling, a function to hold the battery cells 110 while maintaining a uniform pressure is not performed well. For this reason, if the conventional foam pad is applied to the monoframe 120, the battery cell 110 will freely move in the monoframe 120. To solve the problem, the present disclosure proposes the unique cushion bag 150.

Subsequently, a fluid is injected into the cushion bag 150 (S5). When the fluid is injected, the volume of the cushion bag 150 expands. Accordingly, the cushion bag 150 may be provided in close contact between the battery cell 110 and the monoframe 120. In this step, air may be injected using, for example, a compressor, and in this case, variation of the product quality may be improved. As the fluid injection port 152 protrudes out of the monoframe 120, it is easy to inject air by connecting a compressor.

As described above, in assembling, a fluid is not injected into the cushion bag 150 to have a sufficient assembly tolerance, and after assembling, a fluid is injected into the cushion bag 150 to obtain a desired pressure. The cushion bag 150 may be provided in close contact between the battery cell 110 and the monoframe 120 so that there is nearly no empty space in the battery module 100, thereby greatly improving the mechanical performance of the battery module in the event of cell pressing, cell swelling and impacts.

Subsequently, when fluid injection is further performed periodically, a uniform pressure in the cushion bag 150 is maintained.

As described above, according to the method for fabricating a battery module of the present disclosure, assembly of the battery module is made easy, and when the cell pressed and swollen, an effect in controlling a desired pressure is excellent and there is an effect on damage reduction in the event of impacts.

While the preferred embodiments of the present disclosure have been hereinabove illustrated and described, the present disclosure is not limited to the foregoing particular embodiments and it is obvious to those skilled in the art that various modifications and changes can be made without departing from the essence of the present disclosure defined in the appended claims and these modifications and changes should not be understood separately from the technical aspect or perspective of the present disclosure.

Meanwhile, although the terms indicating the directions such as up, down, left, right, front and rear have been used herein, these terms refer to a relative location and are provided only for convenience of description, and it is obvious to those skilled in the art that the terms may be changed depending on the position of target objects or observers.

What is claimed is:

1. A battery module, comprising:
two or more pouch battery cells; and
a hollow quadrilateral monoframe in which the battery cells are received,
wherein the monoframe has a first opening and a second opening that are open to two sides in lengthwise direction of the battery cells,
wherein a cushion bag is in close contact between the battery cells and the monoframe, and
wherein the cushion bag and the battery cells protrude from at least one of the first and second opening.

2. The battery module according to claim 1, wherein the cushion bag is formed in a shape of a quadrilateral bag, and has an inner space that is defined and hermetically sealed by film outer walls, and a fluid injection port through which a fluid is injected into the inner space.

3. The battery module according to claim 2, wherein the cushion bag increases in volume as the fluid is injected.

4. The battery module according to claim 2, wherein the fluid injection port protrudes out of the monoframe.

5. The battery module according to claim 2, wherein air is injected into the cushion bag.

6. The battery module according to claim 5, wherein the cushion bag further has a venting hole to discharge air within the cushion bag when an external force is applied to the cushion bag.

7. The battery module according to claim 1, wherein the cushion bag is provided at a contact surface between a surface of the battery cells and the monoframe, and a contact surface between a side surface of the battery cells and the monoframe.

8. A battery pack comprising the battery module according to claim 1.

9. The battery pack according to claim 8, wherein the battery pack is configured to be used as a power source for at least one of: a power tool, an electric car including an electric vehicle (EV), a hybrid electric vehicle (HEV), a plug-in hybrid electric vehicle (PHEV), an electric bicycle including an E-bike and an E-scooter, an electric golf cart, an electric truck, an electric commercial vehicle, or a system for storing power.

10. The battery module according to claim 1, wherein the cushion bag directly contacts the battery cells and the hollow quadrilateral monoframe.

11. The battery module according to claim 1, wherein the cushion bag is configured to be in close contact between the battery cells and the monoframe while the battery cells are in use.

12. The battery module according to claim 1, wherein the cushion bag is configured to be in close contact between the battery cells and the monoframe by default, regardless of an impact.

13. A method for fabricating a battery module, comprising:
　stacking two or more pouch battery cells;
　preparing a hollow quadrilateral monoframe in which the battery cells are received, wherein the monoframe has a first opening and a second opening that are open to two sides in lengthwise direction of the battery cells;
　preparing a cushion bag that is formed in a shape of a quadrilateral bag, wherein the cushion bag has an inner space that is defined and hermetically sealed by film outer walls, and a fluid injection port through which a fluid is injected into the inner space;
　inserting the battery cells through the first opening or the second opening of the monoframe with the cushion bag interposed between the battery cells and the monoframe; and
　injecting a fluid into the cushion bag, leading to volume expansion, so that the cushion bag is provided in close contact between the battery cells and the monoframe,
　the battery module including:
　　the two or more pouch battery cells; and
　　the hollow quadrilateral monoframe in which the battery cells are received,
　　wherein the monoframe has the first opening and the second opening that are open to the two sides in the lengthwise direction of the battery cells,
　　wherein the cushion bag is in close contact between the battery cells and the monoframe, and
　　wherein the cushion bag and the battery cells protrude from at least one of the first and second opening.

14. The method for fabricating a battery module according to claim 13, wherein the fluid injection port protrudes out of the monoframe, and the fluid injection is performed by connecting a compressor.

15. The method for fabricating a battery module according to claim 13, wherein air is injected into the cushion bag, and the cushion bag further has a venting hole to discharge air within the cushion bag when an external force is applied to the cushion bag, so as to achieve pressure control.

16. The method for fabricating a battery module according to claim 13, wherein the cushion bag is provided at a contact surface between a surface of the battery cell and the monoframe and a contact surface between a side surface of the battery cell and the monoframe.

17. The method for fabricating a battery module according to claim 13, wherein the fluid injection is performed periodically to maintain a uniform pressure in the cushion bag.

* * * * *